(12) United States Patent
Mitchell

(10) Patent No.: US 9,994,461 B2
(45) Date of Patent: Jun. 12, 2018

(54) GRAVITY FILTER

(71) Applicant: Helen of Troy Limited, St. Michael (BB)

(72) Inventor: Michael Donovan Mitchell, Franklin, MA (US)

(73) Assignee: HELEN OF TROY LIMITED, St. Michael (BB)

( * ) Notice: Subject to any disclaimer, the term of this patent is extended or adjusted under 35 U.S.C. 154(b) by 0 days. days.

(21) Appl. No.: 13/716,614

(22) Filed: Dec. 17, 2012

(65) Prior Publication Data

US 2014/0014566 A1 Jan. 16, 2014

Related U.S. Application Data

(60) Provisional application No. 61/576,426, filed on Dec. 16, 2011.

(51) Int. Cl.
*C02F 1/42* (2006.01)
*B01D 39/20* (2006.01)
(Continued)

(52) U.S. Cl.
CPC .............. *C02F 1/42* (2013.01); *B01D 24/22* (2013.01); *B01D 27/02* (2013.01); *B01D 39/163* (2013.01); *B01D 39/2024* (2013.01); *B01J 20/28028* (2013.01); *C02F 1/003* (2013.01); *C02F 1/288* (2013.01); *C02F 1/283* (2013.01); *C02F 2001/425* (2013.01); *C02F 2101/20* (2013.01); *C02F 2201/006* (2013.01); *C02F 2307/04* (2013.01); *C02F 2307/10* (2013.01)

(58) Field of Classification Search
CPC .......... C02F 1/002; C02F 1/003; C02F 1/282; C02F 1/283; C02F 1/288; C02F 1/42; C02F 1/425; C02F 2101/20; C02F 2201/006; C02F 2307/10; C02F 1/281; C02F 2001/425; C02F 2307/04; B01J 20/0211; B01J 20/10; B01J 20/28026; B01J 20/28028; B01D 23/14; B01D 24/22; B01D 27/02; B01D 39/2024; B01D 39/163
USPC ..................... 210/266, 502.1, 505
See application file for complete search history.

(56) References Cited

U.S. PATENT DOCUMENTS 3,870,639 A   3/1975   Moore et al.
3,954,614 A   5/1976   Wright et al.
(Continued)

FOREIGN PATENT DOCUMENTS

CN   101569856   11/2009
EP   0163440 A1   5/1985
(Continued)

OTHER PUBLICATIONS

Search Report/Written Opinion dated May 27, 2013 for International Appln. No. PCT/IB2012/002953.
(Continued)

*Primary Examiner* — Matthew O Savage
(74) *Attorney, Agent, or Firm* — Ulmer & Berne LLP

(57) ABSTRACT

Embodiments of a gravity filter for potable water comprise a loose filter bed comprising ion exchange resin particles and activated carbon particles, and a porous non-woven filter substrate disposed downstream of the loose filter bed, wherein the porous non-woven filter substrate comprises an impregnated heavy metal scavenger.

23 Claims, 3 Drawing Sheets

(51) Int. Cl.
  *B01D 24/22* (2006.01)
  *B01D 39/16* (2006.01)
  *B01J 20/28* (2006.01)
  *C02F 1/28* (2006.01)
  *B01D 27/02* (2006.01)
  *C02F 1/00* (2006.01)
  *C02F 101/20* (2006.01)

(56) References Cited

U.S. PATENT DOCUMENTS

| | | | |
|---|---|---|---|
| 4,049,858 A * | 9/1977 | Murphy | 510/520 |
| 4,092,250 A | 5/1978 | Sano et al. | |
| 4,151,092 A | 4/1979 | Grimm et al. | |
| 4,643,981 A | 2/1987 | Card | |
| 4,711,718 A | 12/1987 | Nelson, Jr. | |
| 5,061,367 A | 10/1991 | Hatch et al. | |
| 5,124,177 A | 6/1992 | Kasmark et al. | |
| 5,227,053 A | 7/1993 | Brym | |
| 5,468,847 A | 11/1995 | Heilmann et al. | |
| 5,536,394 A | 7/1996 | Lund et al. | |
| 5,536,396 A * | 7/1996 | Mudra | A47J 31/605 210/232 |
| D406,003 S | 2/1999 | Tanner | |
| 5,882,507 A | 3/1999 | Tanner et al. | |
| 5,911,882 A | 6/1999 | Benjamin et al. | |
| 5,993,935 A | 11/1999 | Rasmussen et al. | |
| 6,004,460 A | 12/1999 | Palmer et al. | |
| 6,103,114 A | 8/2000 | Tanner et al. | |
| 6,187,192 B1 | 2/2001 | Johnston et al. | |
| 6,197,193 B1 * | 3/2001 | Archer | C02F 1/003 210/266 |
| D440,110 S | 4/2001 | Tanner et al. | |
| 6,241,893 B1 | 6/2001 | Levy | |
| 6,274,041 B1 | 8/2001 | Williamson et al. | |
| 6,290,848 B1 | 9/2001 | Tanner et al. | |
| 6,387,144 B1 | 5/2002 | Jaroszczyk et al. | |
| 6,423,224 B1 | 7/2002 | Tanner et al. | |
| 6,432,233 B1 | 8/2002 | Hamlin et al. | |
| D465,377 S | 11/2002 | Murison | |
| 6,524,477 B1 | 2/2003 | Hughes | |
| D473,750 S | 4/2003 | Murison et al. | |
| 6,565,749 B1 | 5/2003 | Hou et al. | |
| 6,602,406 B1 | 8/2003 | Nohren et al. | |
| 6,638,426 B1 * | 10/2003 | Fritter | B01D 36/001 210/266 |
| 6,649,045 B2 | 11/2003 | Tanner et al. | |
| 6,733,827 B2 | 5/2004 | Mitchell et al. | |
| 6,833,075 B2 | 12/2004 | Hughes | |
| 6,852,224 B2 | 2/2005 | Jagtoyen et al. | |
| 6,861,002 B2 | 3/2005 | Hughes | |
| 6,878,285 B2 | 4/2005 | Hughes | |
| 6,881,327 B2 | 4/2005 | Tanner et al. | |
| 7,045,067 B2 | 5/2006 | Brown et al. | |
| 7,186,441 B2 | 3/2007 | Mitchell et al. | |
| 7,291,208 B2 | 11/2007 | Dauber et al. | |
| 7,306,659 B2 | 12/2007 | Gorton et al. | |
| 7,442,310 B2 | 10/2008 | Bortun et al. | |
| 7,537,695 B2 | 5/2009 | Mitchell et al. | |
| 7,560,142 B1 * | 7/2009 | Bass | B01D 39/04 210/503 |
| 7,625,492 B2 | 12/2009 | Jin et al. | |
| 7,632,397 B2 | 12/2009 | Bathula | |
| 7,785,544 B2 | 8/2010 | Alward et al. | |
| 2002/0193453 A1 * | 12/2002 | Bohling et al. | 521/26 |
| 2003/0173287 A1 | 9/2003 | Johnston et al. | |
| 2003/0220039 A1 | 11/2003 | Chen et al. | |
| 2004/0159605 A1 | 8/2004 | Hughes | |
| 2004/0178142 A1 * | 9/2004 | Koslow | A61L 2/0017 210/500.29 |
| 2004/0251207 A1 | 12/2004 | Calberg | |
| 2005/0029198 A1 | 2/2005 | Kaledin et al. | |
| 2005/0035041 A1 | 2/2005 | Nohren et al. | |
| 2005/0098495 A1 | 5/2005 | Hughes | |
| 2005/0247635 A1 | 11/2005 | Vo et al. | |
| 2006/0021928 A1 | 2/2006 | Nelson | |
| 2006/0070950 A1 | 4/2006 | Rasmussen et al. | |
| 2006/0163136 A1 | 7/2006 | Patil et al. | |
| 2006/0178264 A1 | 8/2006 | Kameshima et al. | |
| 2006/0226064 A1 | 10/2006 | Beckman et al. | |
| 2008/0023402 A1 | 1/2008 | Rawson et al. | |
| 2008/0023405 A1 | 1/2008 | Rawson et al. | |
| 2008/0026041 A1 * | 1/2008 | Tepper et al. | 424/445 |
| 2008/0230471 A1 | 9/2008 | Tamada et al. | |
| 2009/0188870 A1 | 7/2009 | Schroeder et al. | |
| 2009/0308800 A1 | 12/2009 | Astle et al. | |
| 2010/0006508 A1 * | 1/2010 | Mitchell et al. | 210/669 |
| 2010/0065503 A1 | 3/2010 | Olson et al. | |

FOREIGN PATENT DOCUMENTS

| | | |
|---|---|---|
| EP | 0402661 A1 | 5/1990 |
| EP | 1739060 A1 | 3/2007 |
| EP | 1900691 A1 | 3/2008 |
| JP | 52022588 | 2/1977 |
| JP | 61011117 | 1/1986 |
| JP | 61011118 | 1/1986 |
| JP | 2003024723 | 1/2003 |
| JP | 2003062562 | 3/2003 |
| JP | 2003071214 | 3/2003 |
| JP | 2003230882 | 8/2003 |
| JP | 2004174357 | 6/2004 |
| JP | 2004321977 | 11/2004 |
| TW | 267399 | 12/2006 |
| WO | 86/01841 A1 | 3/1986 |
| WO | 89/00977 A1 | 2/1989 |
| WO | 89/11325 A1 | 11/1989 |
| WO | 97/27884 A1 | 8/1997 |
| WO | 98/30326 A1 | 7/1998 |
| WO | 01/07090 A1 | 2/2001 |
| WO | 01/87777 A2 | 11/2001 |
| WO | 02/30766 A2 | 4/2002 |
| WO | 2004/028660 A1 | 4/2004 |
| WO | 2004/052789 A2 | 6/2004 |
| WO | 2005082523 | 9/2005 |
| WO | 2005/113126 A1 | 12/2005 |
| WO | 2007/073822 A1 | 7/2007 |
| WO | 2007/126828 A1 | 11/2007 |
| WO | 2008110167 | 9/2008 |
| WO | 2009012189 | 1/2009 |
| WO | 2009/017645 A2 | 2/2009 |
| WO | 20091401033 | 11/2009 |

OTHER PUBLICATIONS

International Preliminary Report on Patentability dated Jun. 17, 2014 pertaining to International application No. PCT/IB2012/002953.

* cited by examiner

GRAVITY FILTER

CROSS REFERENCE TO RELATED APPLICATION

This application claims benefit to the U.S. Provisional Application Ser. No. 61/576,426 filed Dec. 16, 2011.

TECHNICAL FIELD

The present invention is generally directed to gravity filters, and is specifically directed to filters comprising a porous non-woven filter and a loose bed of activated carbon and heavy metal scavenger material.

BACKGROUND

Fluid contaminants, particularly contaminants in water, may include various elements and compositions such as heavy metals (e.g., lead), microorganisms (e.g., bacteria, viruses), acids (e.g., humic acids), or any contaminants listed in NSF/ANSI Standard No. 53. As used herein, the terms "microorganism", "microbiological organisms", "microbial agent", and "pathogen" are used interchangeably. These terms, as used herein, refer to various types of microorganisms that can be characterized as bacteria, viruses, parasites, protozoa, and germs. In a variety of circumstances, these contaminants, as set forth above, must be removed before the water can be used. For example, in many medical applications and in the manufacture of certain electronic components, extremely pure water is required. As a more common example, any harmful contaminants must be removed from the water before it is potable, i.e., fit to consume. While filtering is conducted in some industrial/municipal water treatment systems, these filters may not be suitable for and/or achieve the removal performance suitable or required for use in consumer-friendly water filtering applications, e.g. household and personal use filter applications, and/or to produce potable water. As a result, there is a continual need for filters with improved removal capability of contaminants.

SUMMARY

According to one embodiment, a gravity filter is provided. The gravity filter comprises a loose filter bed comprising ion exchange resin particles and activated carbon particles, and a porous nonwoven filter substrate disposed downstream of the loose filter bed, wherein the porous nonwoven filter substrate comprises an impregnated heavy metal scavenger.

According to yet another embodiment, the gravity filter comprises a filter housing, a loose filter bed disposed in the filter housing and comprising weak acid ion exchange resin and activated carbon, and a porous nonwoven filter substrate disposed downstream of the loose filter bed inside the filter housing, wherein the porous nonwoven filter substrate comprises glass fibers and is impregnated with amorphous titanium silicate.

These and additional objects and advantages provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith.

Figure 1:
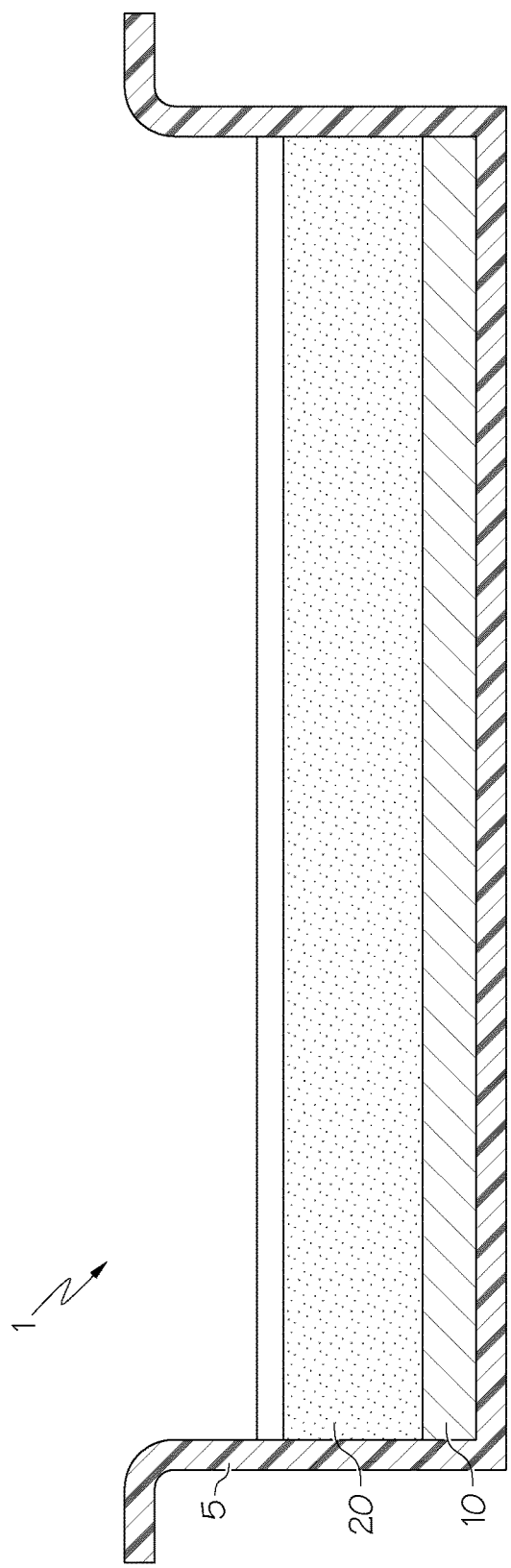
FIG. 1 is side cross-sectional view of the filter according to one or more embodiments of the present invention.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

Definitions

"Bio-based content" refers to the amount of carbon from a renewable resource in a material as a percent of the mass of the total organic carbon in the material, as determined by ASTM D6866-10, method B. As would be understood, carbon from inorganic sources such as calcium carbonate is not included in determining the bio-based content of the material.

"Petroleum" refers to crude oil and its components of paraffinic, cycloparaffinic, and aromatic hydrocarbons. Crude oil may be obtained from tar sands, bitumen fields, and oil shale.

"Renewable" refers to a natural resource that can be replenished within a 100 year time frame. The resource may be replenished naturally, or via agricultural techniques. Renewable resources include plants, animals, fish, bacteria, fungi, and forestry products. They may be naturally occurring, hybrids, or genetically engineered organisms. Natural resources such as crude oil, coal, and peat which take longer than 100 years to form are not considered to be renewable resources.

Filter Embodiments

The filters, which are described in detail below, are operable individually to remove contaminants such as heavy metals, humic acids, and/or microorganisms from fluids. By using a combination of filter media, the filters may remove such contaminants more effectively and/or at an increased level. The water filters may be used in industrial and commercial applications as well as personal consumer applications, e.g., household and personal use applications. The water filter is operable to be used with various fixtures, appliances, or components familiar to one of skill in the art. For example, it can be used in a refrigerator for water filtering, or mounted inside a fluid pitcher. In yet another embodiment, the water filter may be faucet mounted.

Figure 2:
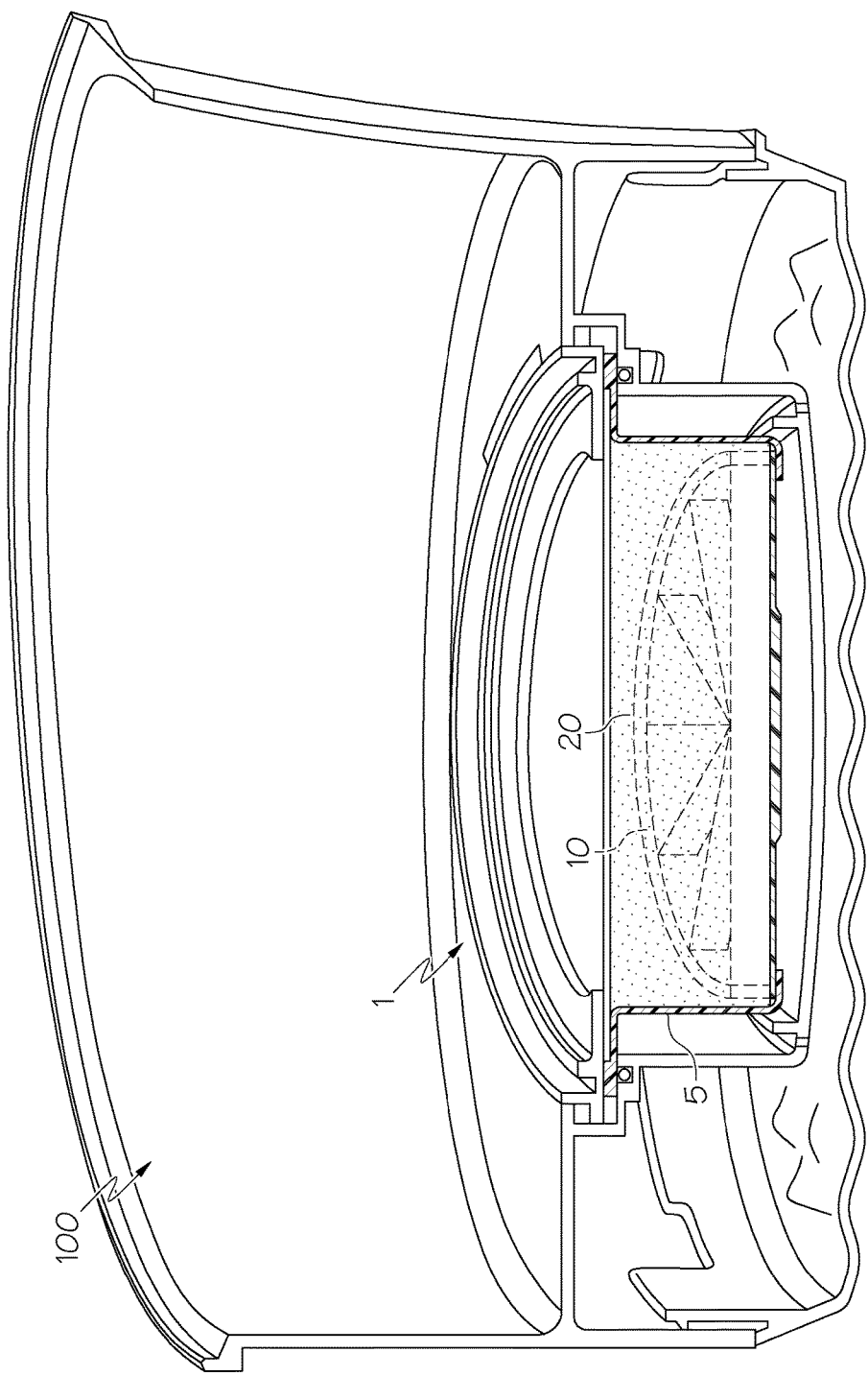
FIG. 2 is a perspective cross-sectional view of the filter housing and filter therein according to one or more embodiments of the present invention.
Figure 3:
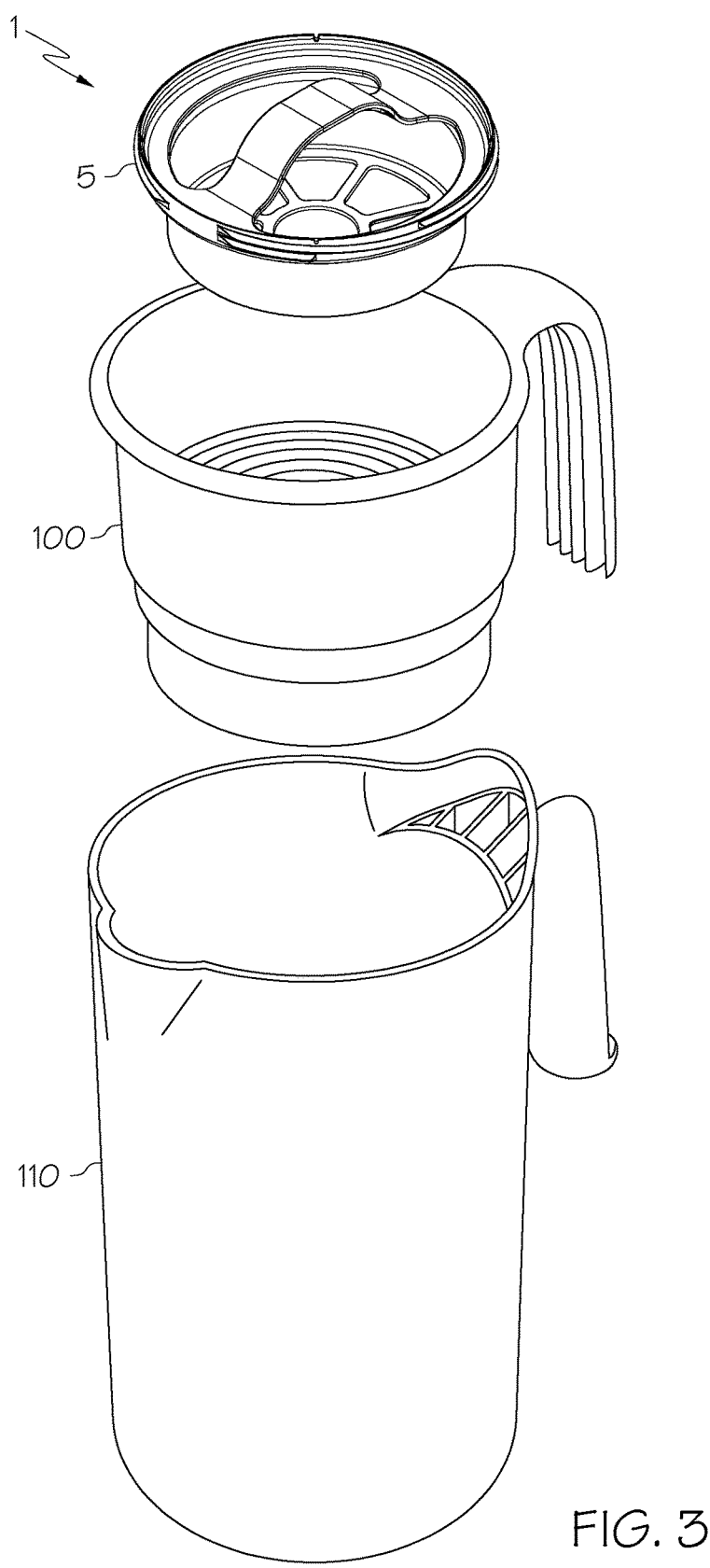
FIG. 3 is an exploded view of a pitcher filter according to one or more embodiments of the present invention.

Referring to FIG. 1, the gravity filter 1 comprises a filter housing or enclosure 5 derived from a polyolefin that may be obtained in part from a renewable monomer or polymer source, a loose filter bed 20 comprising ion exchange resin particles and activated carbon particles, and a porous nonwoven filter substrate 10 disposed downstream of the loose filter bed 20. Additionally, the filter may comprise a scrim layer above the loose filter bed. In one embodiment, the porous nonwoven filter substrate comprises a heavy metal scavenger, for example, a heavy metal scavenger impregnated into the porous nonwoven filter substrate 10. Referring to the embodiment of FIG. 2, the filter 1 comprises a filter housing 5 which includes the loose filter bed 20 and the porous nonwoven filter substrate 10. In yet another embodiment depicted in FIG. 3, the filter housing 5 may be inserted into the upper receptacle 100 of a pitcher 110, wherein unfiltered water received by the upper receptacle 100 is filtered by the filter housing 5 and dispensed via the pitcher 110. Currently, the flow rates are between about 275 ml/min to about 330 ml/min, when measured at a maximum flow rate and a head pressure of 3 inches of water.

Without being bound by theory, metal removal by the heavy metal scavenger impregnated porous non-woven substrate is improved by the addition of the ion exchange resin in the loose bed. Due to this combination, the present filter is capable of meeting the new NSF 53 standards for lead reduction. NSF Standard 53, which applies to drinking water treatment units, sets requirements for reduction of specific health-related contaminants, such as *Cryptosporidium, Giardia*, lead, volatile organic chemicals (VOCs), MTBE (methyl tertiary-butyl ether) that may be present in drinking water. In accordance with the NSF standard 53, the filters of the present invention are capable of reducing lead in a fluid from a concentration of 150 ppb to less than 10 ppb, or less than 4 ppb, or less than 2 ppb.

While many compositions are contemplated, the ion exchange resin may be a weak acid cationic exchange resin, which uses carboxylic acid as the functional group. For example, the ion exchange resin may comprise a copolymer of acrylic acid. Examples of weak acid cation exchange resins are R&H IRC84, R&H IRC50, Ionac CC, ResinTech WACG and ResinTec WACMP. Alternatively, other ion exchange resins, for example, strong acid cationic exchange resins, such as sulfonic resins, are also contemplated herein. In one or more embodiments, the loose bed comprises about 20 to about 70% by weight ion exchange resin, or about 40 to about 60% by weight ion exchange resin, or about 52 to about 56% by weight ion exchange resin.

In accordance with a few exemplary embodiments, the activated carbon particles of the carbon filter may comprise carbons from a variety of sources, e.g., wood-based carbon, coconut carbon, recycled carbon, or combinations thereof. In an exemplary commercial embodiment, the activated carbon particles comprise coconut carbon. Other sources, for example, suitable lignocellulose derived carbons, are contemplated herein. Various recycled carbon sources are also suitable. For example, and not by way of limitation, the renewable carbon sources may include $CO_2$, molasses, whey, cellulose hydrolysates, starch hydrolysates, industrial effluents, cellulosic wastes, nutshells, or combinations thereof. To conserve costs and minimize environmental detriment, regeneration of activated carbon is often utilized. For example, current regeneration methods may include thermal regeneration, chemical and solvent regeneration, microbial regeneration, electrochemical regeneration, ultrasonic regeneration, wet air oxidation, or combinations thereof.

In some embodiments, it may be desirable to use mixtures of carbon particles to achieve a desired particle and pore size distribution. For example, wood based carbons, which are predominantly mesoporous (between 2 and 50 nm pore size) and coconut carbons, which are predominantly microporous (less than 2 nm pore size), may be mixed together. Examples of such activated carbon particle structures and compositions are provided in U.S. Pat. Nos. 7,316,323, 6,852,224, 6,827,854, 6,783,713, 6,733,827, 6,565,749, 6,423,224, 6,290,848, and U.S. Publication Nos. 20080015611, 20070080103, 20040159596, 20040232065, 20040129617, and 20040164018, which are all incorporated by reference in their entirety herein.

As used herein, the phrase "median particle size" refers to the diameter of a particle below or above which 50% of the total volume of particles lies. This median particle size is designated as $D_{v,0.50}$. While many methods and machines are known to those skilled in the art for fractionating particles into discreet sizes, sieving is one of the easiest, least expensive and common ways to measure particle sizes and particle size distributions. An alternative preferred method for determining size distribution of particles is with light scattering. Further, the phrase, "particle span" is a statistical representation of a given particle sample and can be calculated as follows. First, the median particle size, $D_{v,0.50}$, is calculated as described above. Then by a similar method, the particle size that separates the particle sample at the 10% by volume fraction, $D_{v,0.10}$, is determined, and then the particle size that separates the particle sample at the 90% by volume fraction, $D_{v,0.90}$, is determined. The particle span is then equal to: $(D_{v,0.9}-D_{v,0.10})/D_{v,0.50}$. In one exemplary embodiment, the carbon filter may comprise activated carbon filter particles having a median particle size of less than about 100 μm, less than about 50 μm, less than about 40 μm, less than about 37.5 μm, or less than about 35 μm. Moreover, the filter particles may have a particle span from about 1.8 or less, about 1.5 or less, about 1.4 or less, and about 1.3 or less.

Additionally, the activated carbon may demonstrate a mesopore volume from about 0.5 ml/gm to about 0.7 ml/gm, and a total pore volume from about 1 ml/gm to about 1.5 ml/gm. Moreover, in one exemplary embodiment, the activated carbon may include mesopores having a pore diameter from about 2 nm to about 50 nm, a particle size of about 30 μm diameter, and a particle span from about 1 to about 1.6, or from about 1.3 to about 1.4. As used herein, the term "mesopore" is intended to refer to an intra-particle pore having a width or diameter between 2 nm and 50 nm (or equivalently, between 20 Å and 500 Å). As used herein, the phrase "mesopore volume" refers to the volume of all mesopores. Similar to the ion exchange resin, various amounts are contemplated for the activated carbon in the loose bed. For example, the loose bed may comprise about 30 to about 70% by weight activated carbon, or from about 40 to about 50% by weight activated carbon.

The porous nonwoven substrate may comprise various materials familiar to one or ordinary skill in the art. Materials used in current commercial nonwoven fabrics, for example, polyolefins or polyesters, such as polyethylene terephthalate (PET), may derived from non-renewable resources, especially petroleum. In one or more embodiments, the nonwoven polyolefins may comprise polyethylene, polypropylene, and combinations thereof. Such polymers are at least partially derived from ethylene glycol or related compounds which are obtained directly from petroleum via cracking and refining processes. Thus, the price and availability of the petroleum feedstock ultimately has a significant impact on the price of nonwoven fabrics which utilize materials derived from petroleum. As the worldwide price of petroleum escalates, so does the price of such nonwoven fabrics.

Consequently, the porous nonwoven substrate of the present invention may also be at partially derived from renewable resources. For example, the porous nonwoven substrate may comprise a bio-based content of about 10% to about 100% using ASTM D6866-10, method B. The application of ASTM D6866-10 to derive a "bio-based content" is built on the same concepts as radiocarbon dating, but without use of the age equations. The analysis is performed by deriving a ratio of the amount of organic radiocarbon (14C) in an unknown sample to that of a modern biomass reference standard, for example, corn. In further embodiments, a nonwoven substrate comprises a bio-based content value from about 25% to about 75% using ASTM D6866-10, method B. In yet another embodiment, a structured fibrous web comprises a bio-based content value from about 50% to about 60% using ASTM D6866-10, method B.

A suitable example of renewable nonwoven materials are renewable polyesters. Renewable polyesters can include alkylene terephthalates. Such suitable alkylene terephthaltes at least partially derived from renewable resources can include polyethylene terephthalate (PET), polytrimethylene terephthalate (PTT), polybutylene terephthalate (PBT), polycyclohexylene dimethyl terephthalate (PCT), and combinations thereof. For example, such bio-sourced alkylene terephthalates are described in U.S. Pat. No. 7,666,501; U.S. Patent Publication Nos. 2009/0171037, 2009/0246430, 2010/0028512, 2010/0151165, 2010/0168371, 2010/0168372, 2010/0168373, and 2010/0168461; and PCT Publication No. WO 2010/078328, the disclosures of which are herein incorporated by reference.

An alternative to bio-sourced PET can include poly(ethylene 2,5-furandicarboxylate) (PEF), which can be produced from renewable materials. PEF can be a renewable or partially renewable polymer that has similar thermal and crystallization properties to PET. PEF serve as either a sole replacement or a blend with petro based PET (or another suitable polymer) in spunbond fibers and the subsequent production of a non-woven based on these fibers with renewable materials. Examples of these PEFs are described in PCT Publication Nos. WO 2009/076627 and WO 2010/077133, the disclosures of which are herein incorporated by reference. Certain polylactic acid fibers which can be used in place of other polyesters, such as PET, are described in U.S. Pat. No. 5,010,175, the disclosure of which is herein incorporated by reference.

Alternatively, the nonwoven substrate may comprise cellulose and glass fibers Suitable nonwoven materials may be commercially available from Ahlstrom Corporation. Nonwoven materials may also be available from recycled waste streams. It is contemplated that the porous nonwoven filter substrate may comprise a hydrophobic binder, e.g., a polyethylene binder, a hydrophilic binder (e.g., a latex based binder), or combinations thereof.

Although various pore sizes are contemplated, the porous nonwoven substrate may comprise an average pore size of up to about 15 µm, or about 3 µm to about 14 µm, or an average pore size of from about 5 µm to about 7 µm. For lead or heavy metal removal, various compositions familiar to the skilled person would be suitable. For example, the selection of heavy metal scavenger may be dependent on the types of metals or the form of metals, for example, the insoluble colloidal form of lead or soluble lead. In one embodiment, the heavy metal scavenger metal ion exchange zeolite sorbents such as amorphous titanium silicate, activated aluminas, zirconium oxides and hydroxides, and combinations thereof. In a specific embodiment, the heavy metal scavenger is an amorphous titanium silicate impregnated in the porous non-woven substrate. The porous nonwoven substrate with impregnated heavy metal scavenger may comprise up to about 40% by weight amorphous titanium silicate, or from about 18 to about 30 percent by weight amorphous titanium silicate, or about 20 to about 24 percent by weight amorphous titanium silicate. Various particle sizes are contemplated for the heavy metal scavenger (e.g., amorphous titanium silicate). For example, the ATS may have a mean diameter of up to about 100 µm, or from about 20 to about 80 µm, or about 30 to about 40 µm.

In further embodiments, the porous non-woven filter substrate may also be impregnated with other filtering materials, for example, activated carbon. The impregnated activated carbon in the porous non-woven substrate may comprise the same type(s) or different type(s) of activated carbon from the activated carbon in the loose bed. The activated carbon may be obtained from a recycled source of natural activated carbons.

In one embodiment, the porous non-woven substrate is produced by adding the ATS to a solution containing glass and cellulose fibers as well as the polyethylene binder. Then the mixture is sprayed or pumped onto a wire screen to remove the water, but leave the ATS entangled in the glass fiber. To produce the loose bed, the activated carbon particles and ion exchange resin are mixed together in loose particle form and are poured into the back of the filter.

It is also contemplated to use additional components, such as additional sorbents, in order to improve the filtering capacity of the present filters.

It is further noted that terms like "preferably," "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

What is claimed is:

1. A gravity filter comprising:
    a loose filter bed comprising an ion exchange resin and activated carbon; and
    a porous non-woven filter substrate disposed downstream of the loose filter bed, the porous non-woven filter substrate comprising a fibrous material impregnated with heavy metal scavenger particles and further comprising an average pore size of from about 5 µm to about 15 µm; and
    wherein the heavy metal scavenger particles consist of one or more of amorphous titanium silicate, a zirconium oxide, and a zirconium hydroxide, and the fibrous materials consists of one or more of polyolefin fibers, polyester fibers, glass fibers, and cellulose fibers.

2. The filter of claim 1 wherein the ion exchange resin is a weak acid cationic exchange resin, a strong cation exchange resin, or combinations thereof.

3. The filter of claim 1 wherein the ion exchange resin is a copolymer of acrylic acid.

4. The filter of claim 1 wherein the ion exchange resin is a sulfonic acid resin.

5. The filter of claim 1 wherein the fibrous material is further impregnated with activated carbon.

6. The filter of claim 1 wherein the porous non-woven filter substrate comprises a binder.

7. The filter of claim 6, wherein the binder comprises a hydrophobic binder, a hydrophilic binder, or combinations thereof.

8. The filter of claim 1 wherein the heavy metal scavenger particles are amorphous titanium silicate.

9. The filter of claim 8, wherein the porous non-woven substrate comprises from about 18 to about 30% by weight of the amorphous titanium silicate.

10. The filter of claim 1 wherein the fibrous material consists of cellulose fibers and glass fibers and optionally one or more of polyolefin fibers and polyester fibers.

11. The filter of claim 1 wherein the loose bed comprises about 20 to about 70% by weight of the ion exchange resin.

12. The filter of claim 1 wherein the loose bed comprises about 30 to about 70% by weight of the activated carbon.

13. The filter of claim 1, further comprising a scrim layer positioned above the loose filter bed.

14. A gravity filter comprising:
a filter housing;
a loose filter bed disposed in the filter housing and comprising a weak acid ion exchange resin and activated carbon; and
a porous nonwoven filter substrate disposed downstream of the loose filter bed inside the filter housing, wherein the porous nonwoven filter substrate comprises glass fibers impregnated with amorphous titanium silicate particles and further comprising an average pore size of from about 5 μm to about 15 μm.

15. The filter of claim 14 further comprising a scrim layer above the loose filter bed.

16. The filter of claim 14 wherein the porous non-woven filter substrate comprises a binder.

17. The filter of claim 16 wherein the binder comprises a hydrophobic binder, a hydrophilic binder, or combinations thereof.

18. The filter of claim 14 wherein the porous non-woven substrate further comprises cellulose fibers.

19. The filter of claim 14 wherein the porous non-woven substrate comprises from about 18 to about 30 percent by weight of the amorphous titanium silicate.

20. The filter of claim 14 wherein the porous non-woven substrate comprises an average pore size of from about 3 nm to about 14 nm.

21. The filter of claim 14 wherein the porous non-woven substrate comprises an average pore size of from about 5 nm to about 7 nm.

22. The filter of claim 14 wherein the loose bed comprises about 20 to about 70% by weight of the ion exchange resin.

23. The filter of claim 14 wherein the loose bed comprises about 30 to about 70% by weight of the activated carbon.

* * * * *